INVENTOR.
LORENZO D. MOORE
WILLIAM G. COLE
BY Oberlin & Limbach
ATTORNEYS.

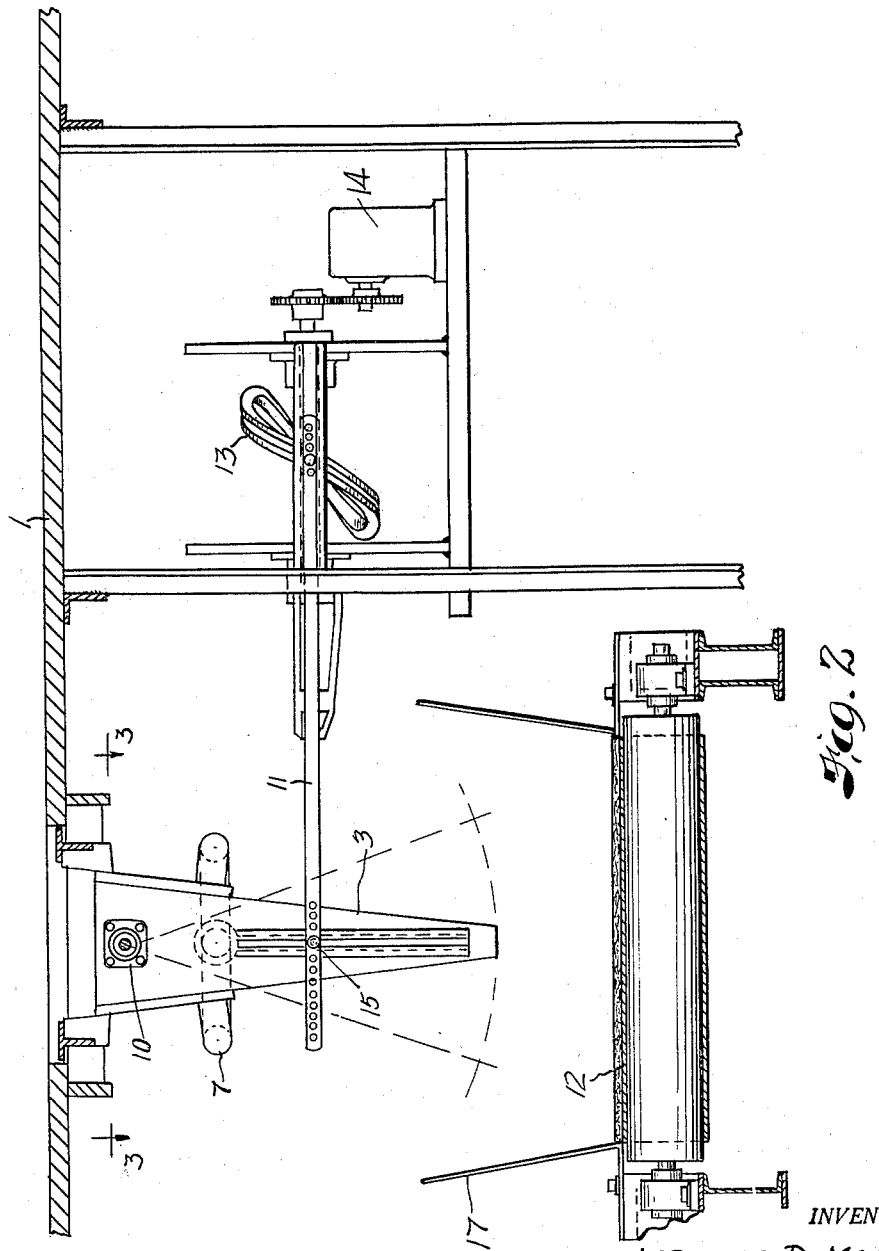

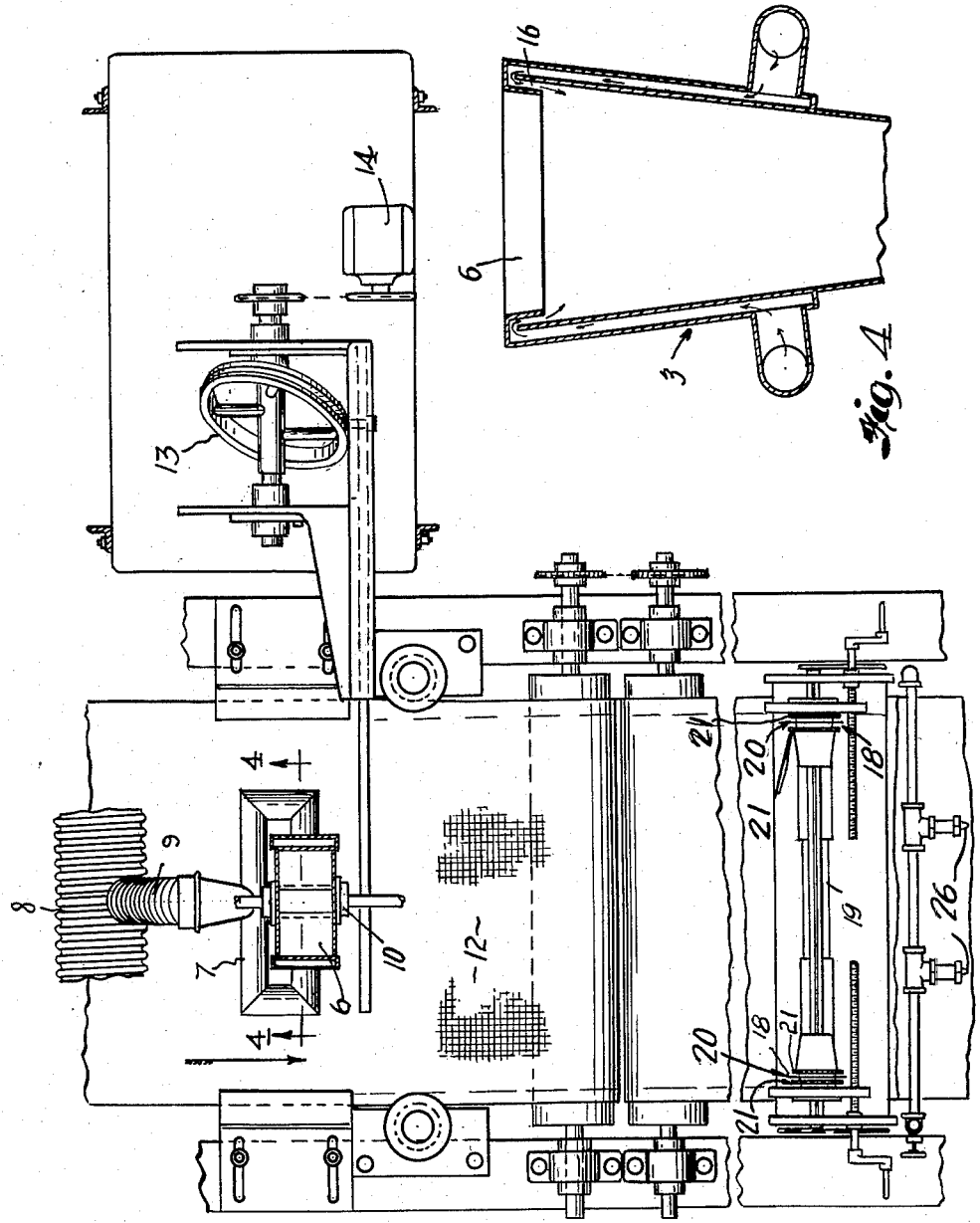

United States Patent Office 2,925,117
Patented Feb. 16, 1960

2,925,117

APPARATUS FOR MAKING BONDED FIBROUS GLASS MATS

Lorenzo D. Moore and William G. Cole, Nashville, Tenn., assignors to Ferro Corporation, Cleveland, Ohio, a corporation of Ohio Application May 22, 1956, Serial No. 586,622

4 Claims. (Cl. 154—29)

This invention relates generally to a method and apparatus for producing bonded mats of glass fibers and refers more particularly to improvements in the equipment to produce a more uniform fibrous mat.

An object of this invention is to provide an improved apparatus for depositing glass fibers to form mats of controlled thickness and density.

Another object of this invention is to provide a method and means for continuously producing a felted product of fibrous glass having a controlled width and smooth even edges.

Another object of this invention is to provide means for reusing trimmings in the production of new mats.

Other objects will appear as the description proceeds.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

The present invention provides new and novel means for distributing chopped fiber glass strand which method includes blowing the chopped fibers onto a foraminous conveyor through a laydown chute arranged to make an annular motion or swing in a plane perpendicular to the direction of the conveyor movement whereby the chopped fibers are distributed over the conveyor in an overlapping pattern resulting in a mat of superior weight uniformity, the mat thus formed passes through a novel trimming device which makes the edges even without increasing the thickness of the edges and returns the trimmings back to the laydown chute for formation into new mat.

Referring to the accompanying drawings:

Fig. 2 is a front elevation view showing the lay-down chute and traversing mechanism;

Fig. 3 is a top plan view of the principles embodied in Fig. 1;

Fig. 4 is a cross-sectional view of the details of the laydown chute.

Figure 1:
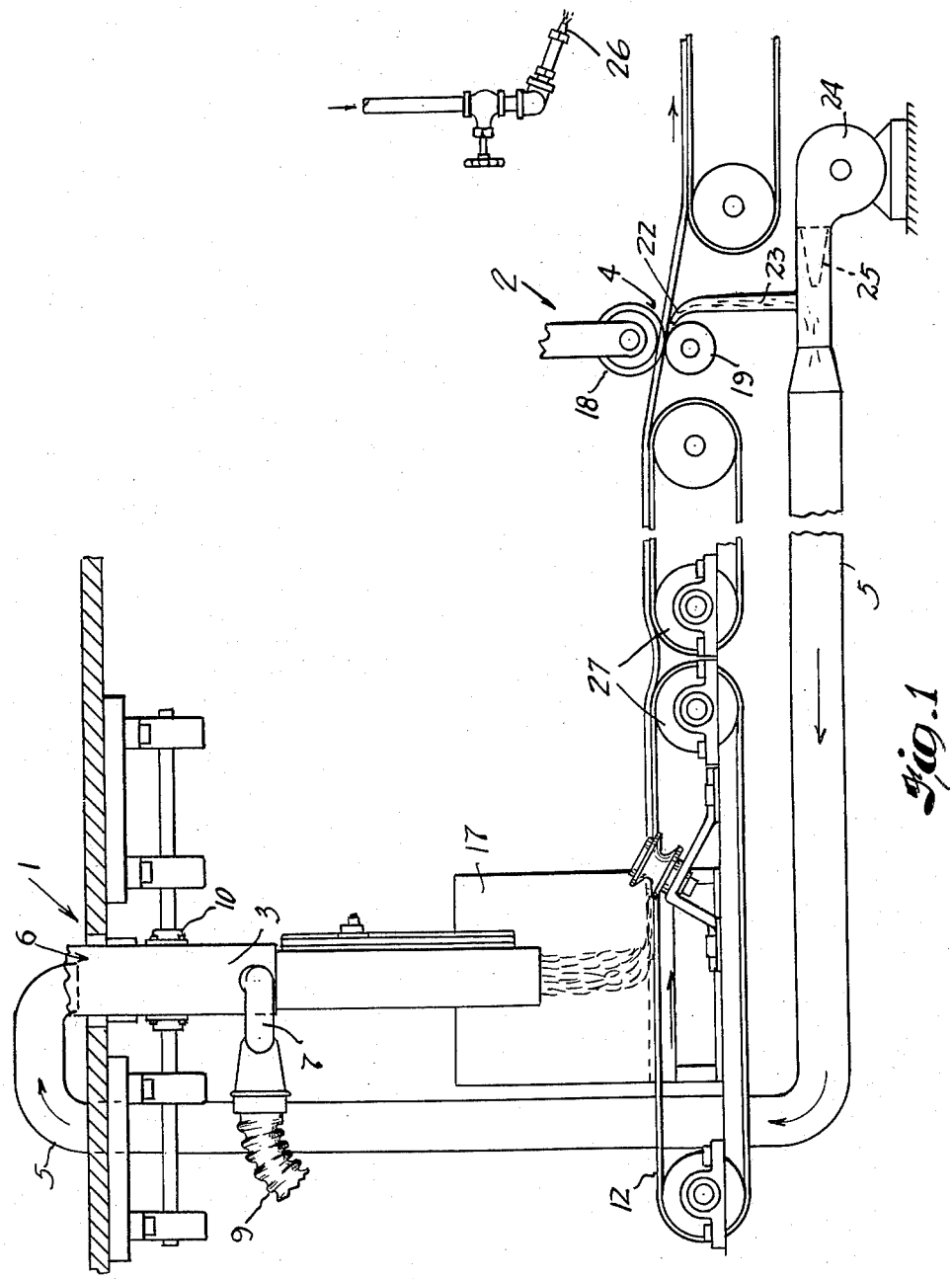
Fig. 1 is a side elevation view embodying the principles of the invention.

Referring now more specifically to the drawings and more especially to Fig. 1, the apparatus here illustrated is generally divisible into two main parts wherein the part indicated at 1 is, for convenience, called laydown equipment and the apparatus generally indicated at 2 is conveniently called the trimming equipment.

As previously indicated the apparatus and method comprising the present invention utilizes fibrous glass which is available in the form of rovings, cake package strand or other suitable forms of continuous strands. The continuous strands are chopped into short lengths and gravity fed into laydown chute 3. The chopping device has not been illustrated here since it forms no part of the present invention and such chopping devices as hammer mills are well known. Also being fed into laydown chute 3 with the newly chopped fibers are the fibers which have been trimmed from the edges of the mat as at 4 and returned to the laydown chute 3 through the trimmer return tube 5.

The chopped strands enter the laydown chute 3 through opening 6. At this point, if desired, dry resin can be blown in with the chopped strands. The laydown chute is positioned under the chopping device (not shown) and suspended as by bearings 10. A reciprocating arm 11 attached to chute 3 causes it to make an annular motion or swing in a plane perpendicular to the direction of travel of foraminous conveyor.

Reciprocating arm 11 is operated by a traverse mechanism which comprises a gear 13 which is connected to a drive mechanism such as electric motor 14. Gear 13 is of such shape which when rotated translates circular movement into linear movement. Thus the following device of reciprocating arm 11 in contact with gear 13 is given a reciprocating linear motion which when attached to chute 3 causes chute 3 to have an annular swing over conveyor 12. The angle through which chute 3 oscillates can be regulated by changing the length of reciprocating arm 11 as by changing the connecting holes shown at 15.

Laydown chute 3 as best seen in Fig. 4 comprises a chute having a double wall. Air under pressure goes through duct 8 which is connected to ducts 7 as by flexible hose 9. The air thus enters chute 3 and is allowed to only escape through opening 16 which is disposed entirely around the inside periphery of the entrance 6. Thus the air completely surrounds the incoming fibers and carries them down onto conveyor 12 and compacted thereon by the force of the discharging air. As the chute 3 swings through its arc the fibers are evenly deposited across the width of the conveyor 12.

The fibers as deposited on conveyor 12 are carried forward in the direction of the arrow. Conveyor 12 is motivated as by rollers 27 which are connected to a driving mechanism such as an electric motor (not shown here). As the fibers are being carried through reciprocating chute 3 onto the moving conveyor 12 they are deposited in the form of a "curtain." The "curtain" is enfolded back and forth forming an overlapping pattern which results in a mat composed of several layers of the so-called "curtain." Superior mat weight uniformity results from the plurality of layers obtained from the thin and wide "curtain" of strand issuing from chute 3. Thus it will readily be seen that by slowing down or speeding up the forward motion of conveyor 12 it is possible to easily control the thickness of mat formed. Side walls 17 are adjustably connected with conveyor 12 so that they may be moved in or out depending on the predetermined width of the mat being formed. The side walls 17 thus act as a barrier to prevent loss of fibers issuing from reciprocating chute 3.

The mat thus formed (having dry resin mixed therewith if desired) is carried forward by conveyor 12 to trimmer knife 18 which is adjustably mounted on conveyor 12. Below trimmer knife 18 is a hardened roll 19. Thus the mat travels between the knife 18 and the roll 19 where the edges are neatly and continuously trimmed. Trimmer knife 18 consists of a sharp circular blade 20 having a gear 21 with sharp teeth, on each side thereof. As the mat travels forward it is cut by blade 20 and held from slipping by the sharp teeth of gear 21.

The trimmings from the edges are picked up as by nozzle 22 and sucked into return duct 5 where they are mixed with newly chopped fibers to form mat. The trimmed fibers are sucked into nozzle 22 through duct 23 into duct 5 by the Venturi effect caused by blower 24 and Venturi nozzle 25.

The trimmed mat leaves the trimmer 18 and is thoroughly soaked by a stream of resin in water through nozzles 26. The resins usable in the mat made by the present invention are those commonly known to those skilled in the art. Both the thermosetting resins, such as phenolics, melamines, polyesters, etc. and the thermoplastic resins such as modified polyesters, polyvinyl acetate, polystyrene, etc. can be used.

After being soaked with resin the mat is fed into the feed end of a curing oven. The oven is not shown here since it does not form a part of the invention and is readily known to those skilled in the art. Within the oven the mat is subjected to a temperature to fix the resin and bond the mat. The water which has been introduced to the mat with the resin at nozzles 26 is of course evaporated in the oven.

The foregoing apparatus and method produces a mat uniform in size, weight, thickness and color.

Other modes of applying the principle of the invention may be employed, change being made as regards the details describd provided the feature stated in any of the following claims as the equivalent of such be employed.

We, therefore, particularly point and distinctly claim as our invention:

1. An apparatus for producing a mat of chopped fibrous glass comprising in combination, a generally horizontally oriented movable endless foraminous conveyor, chute means for uniformly depositing chopped glass fiber on the upper surface of said conveyor to produce a mat of fibers thereon, said chute means being pivotally suspended on a generally horizontal axis above said conveyor and extending downwardly toward the latter, for oscillating movement in a plane generally perpendicular to the direction of travel of said conveyor, the speed of said conveyor being so coordinated with respect to the oscillation of said chute means so as to produce a mat of predetermined and uniform thickness of overlapping layers of fiber on the top surface of said conveyor, means at the upper end of said chute means for entraining the chopper fibers in an aeroform stream for depositing the fibers in generally compact condition on the upper surface of said conveyor, cutter means downstream from said chute means for uniformly trimming the edges of the mat formed on said conveyor to thereby provide a uniform width fiberglass mat, means coacting with said cutter means for returning the fibers trimmed from said mat directly to said chute means for mixing of the trimmed fibers with newly chopped fibers in said aeroform stream, and means for introducing liquid fiber bonding material on said mat in an area downstream from said cutter means.

2. An apparatus for producing a mat of chopped fibrous glass comprising in combination, a generally horizontally oriented foraminous movable endless conveyor adapted to be moved longitudinally in a predetermined direction, chute means for uniformly depositing chopped glass fiber on the upper surface of said conveyor to produce a mat of fibers thereon, said chute means being pivotally suspended on a generally horizontal axis above said conveyor and extending downwardly toward the latter, for oscillating movement in a plane generally perpendicular to the direction of travel of said conveyor, the speed of said conveyor being so coordinated with respect to the oscillation of said chute means so as to produce a mat of predetermined and uniform thickness of overlapping layers of fiber on the top surface of said conveyor, means for selectively changing the range of pivotal movement of said chute means whereby mats of different widths may be produced by said fiber depositing chute means, means at the upper end of said chute means for entraining the chopped fibers in an aeroform stream for depositing the fibers in generally compact condition on the upper surface of said conveyor, cutter means downstream from said chute means for uniformly trimming the edges of the mat formed on said conveyor to thereby provide a uniform width fiberglass mat, means for adjusting the position of said cutter means in a direction transverse of said conveyor, suction and blower means for returning the fibers trimmed from said mat directly to said chute means for mixing of the trimmed fibers with newly chopped fibers in said aeroform stream, and means for introducing a liquid fiber bonding material on said mat in an area downstream from said cutter means.

3. An apparatus for producing a mat of chopped fibrous glass comprising in combination, a generally horizontally oriented movable endless foraminous conveyor adapted to be moved in a predetermined direction at selective and variable speeds, chute means for uniformly depositing chopped glass fibers on the upper surface of said conveyor to produce a mat of fibers thereon, said chute means being pivotally suspended on a generally horizontal axis above said conveyor and extending generally vertically downwardly toward the latter, for oscillating movement in a plane generally perpendicular to the direction of travel of said conveyor, the speed of said conveyor being so coordinated with respect to the fiber depositing chute means so as to produce a mat of predetermined and uniform thickness of overlapping layers of fiber on said conveyor, means circumscribing the upper end of said chute means for entraining the chopped fiber in an aeroform stream for depositing the same in generally compact condition on the upper surface of said conveyor, means for selectively changing the range of pivotal movement of said chute means whereby mats of different widths may be produced by said apparatus, rotary cutter means downstream from said chute means for uniformly trimming the edges of the mat formed on said conveyor to thereby provide a uniform width fiberglass mat, means for adjusting the position of said cutter means in a direction transverse of said conveyor, suction and blower means coacting with said cutter means for picking up the trimmed fibers from said mat and blowing such trimmings directly to said chute means for mixing of the trimmed fibers with newly chopped fibers in said aeroform stream, and means downstream from said cutter means for introducing liquid fiber bonding material on said mat.

4. In an apparatus in accordance with claim 2 wherein said conveyor comprises upstanding side walls for confining the fibers issuing from said chute means, and means for adjusting the position of said side walls in a generally horizontal direction transverse of said conveyor.

References Cited in the file of this patent
UNITED STATES PATENTS

| | | |
|---|---|---|
| 1,336,402 | Weiss | Apr. 6, 1920 |
| 1,468,028 | Maussner et al. | Sept. 18, 1923 |
| 2,571,335 | Browne | Oct. 16, 1951 |
| 2,577,205 | Meyer et al. | Dec. 4, 1951 |
| 2,635,301 | Schubert et al. | Apr. 21, 1953 |
| 2,693,619 | Goss | Nov. 9, 1954 |
| 2,743,758 | Uschmann | May 1, 1956 |
| 2,790,741 | Sonneborn et al. | Apr. 30, 1957 |

FOREIGN PATENTS

| | | |
|---|---|---|
| 95,853 | Sweden | May 30, 1939 |